US008677734B2

(12) United States Patent
Ramanathan et al.

(10) Patent No.: US 8,677,734 B2
(45) Date of Patent: Mar. 25, 2014

(54) METHOD OF PRODUCING AMMONIA EFFECTIVE TO CONTROL AFTERTREATMENT CONDITIONS OF NOX EMISSIONS

(75) Inventors: Karthik Ramanathan, Bangalore (IN); Ashok Gopinath, Bangalore (IN)

(73) Assignee: GM Global Technology Operations LLC, Detroit, MI (US)

( * ) Notice: Subject to any disclaimer, the term of this patent is extended or adjusted under 35 U.S.C. 154(b) by 452 days.

(21) Appl. No.: 12/762,408

(22) Filed: Apr. 19, 2010

(65) Prior Publication Data
US 2011/0252766 A1 Oct. 20, 2011

(51) Int. Cl.
*F01N 3/00* (2006.01)
(52) U.S. Cl.
USPC ............... 60/285; 60/274; 60/295; 60/301
(58) Field of Classification Search
USPC .................... 60/285, 286, 299, 301, 295
See application file for complete search history.

(56) References Cited

U.S. PATENT DOCUMENTS

| 2004/0076565 | A1* | 4/2004 | Gandhi et al. | 423/235 |
|---|---|---|---|---|
| 2007/0028601 | A1* | 2/2007 | Duvinage et al. | 60/286 |
| 2007/0271905 | A1* | 11/2007 | Muraguchi | 60/284 |
| 2008/0314034 | A1* | 12/2008 | Arnold et al. | 60/299 |
| 2009/0104088 | A1* | 4/2009 | Takagi et al. | 422/171 |
| 2009/0149318 | A1* | 6/2009 | Gandhi et al. | 502/73 |
| 2010/0058742 | A1* | 3/2010 | Hirata et al. | 60/286 |

* cited by examiner

*Primary Examiner* — Thomas Denion
*Assistant Examiner* — Patrick Maines

(57) ABSTRACT

A method for reducing NOx molecules in an exhaust flow within an exhaust aftertreatment system of an internal combustion engine includes storing NOx from the exhaust flow on a NOx storage component within an aftertreatment device exposed to the exhaust flow. When the exhaust flow includes molecular hydrogen, he stored NOx is released to create ammonia in the exhaust flow. In a selective catalytic reduction device that is downstream of the aftertreatment device, the created ammonia is utilized to reduce NOx in the exhaust flow.

12 Claims, 2 Drawing Sheets

METHOD OF PRODUCING AMMONIA EFFECTIVE TO CONTROL AFTERTREATMENT CONDITIONS OF NOX EMISSIONS

TECHNICAL FIELD

This disclosure is related to control of aftertreatment of NOx emissions in internal combustion engines.

BACKGROUND

The statements in this section merely provide background information related to the present disclosure and may not constitute prior art.

Emissions control is one consideration in engine design and engine control. Oxides of nitrogen (NOx) are known by-products of combustion. NOx is created by nitrogen and oxygen molecules present in engine intake air disassociating in the high temperatures of combustion, with higher rates of NOx creation being associated with higher combustion temperatures and longer exposure of air molecules to the higher temperatures. NOx molecules, once created in the combustion chamber, can be converted back into nitrogen and oxygen molecules in exemplary devices known in the art within the broader category of aftertreatment devices.

Modern engine control methods utilize diverse operating strategies to optimize combustion. Some operating strategies, optimizing combustion in terms of fuel efficiency, include lean, localized, or stratified combustion within the combustion chamber in order to reduce the fuel charge necessary to achieve the work output required of the cylinder and increase engine efficiency. For example, by operating in an unthrottled condition, air intake pumping losses are reduced. While temperatures in the combustion chamber can get high enough in pockets of combustion to create significant quantities of NOx, the overall energy output of the combustion chamber, in particular, the heat energy expelled from the engine through the exhaust path can be greatly reduced from normal values. Such conditions can be challenging to exhaust aftertreatment strategies since aftertreatment devices frequently require an elevated operating temperature driven by the exhaust flow temperature to operate adequately to treat NOx emissions.

Aftertreatment devices are known to utilize chemical reactions to treat exhaust flow. One exemplary device includes a selective catalytic reduction device (SCR). Known SCR devices may utilize ammonia derived from urea injection to treat NOx. Ammonia stored on a catalyst bed within the SCR reacts with NOx, preferably in a desired proportion of NO and $NO_2$, and produces favorable reactions to treat the NOx. One exemplary embodiment includes a preferred one to one, NO to $NO_2$ proportion, and is known as a fast SCR reaction. Continued improvement in exhaust aftertreatment requires accurate information regarding NOx emissions in the exhaust flow in order to achieve effective NOx reduction, such as dosing proper amount of urea based on monitored NOx emissions.

Other aftertreatment devices are additionally known for treating the exhaust flow. Three way catalysts (TWC) are utilized particularly in gasoline applications. Lean NOx traps (LNT) utilize catalysts capable of storing some amount of NOx, and engine control technologies have been developed to combine these LNTs or NOx absorbers with fuel efficient engine control strategies to improve fuel efficiency and still achieve acceptable levels of NOx emissions. One exemplary strategy includes using a lean NOx trap to store NOx emissions during fuel lean operations and then purging the stored NOx during fuel rich, higher temperature engine operating conditions with three-way catalysis to nitrogen and water. Diesel particulate filters (DPF) trap soot and particulate matter in diesel applications, and the trapped material is periodically purged in high temperature regeneration events.

SUMMARY

A method for reducing NOx molecules in an exhaust flow within an exhaust aftertreatment system of an internal combustion engine includes storing NOx from the exhaust flow on a NOx storage component within an aftertreatment device exposed to the exhaust flow. When the exhaust flow includes molecular hydrogen, he stored NOx is released to create ammonia in the exhaust flow. In a selective catalytic reduction device that is downstream of the aftertreatment device, the created ammonia is utilized to reduce NOx in the exhaust flow.

BRIEF DESCRIPTION OF THE DRAWINGS

One or more embodiments will now be described, by way of example, with reference to the accompanying drawings, in which.

DETAILED DESCRIPTION

Figure 1:
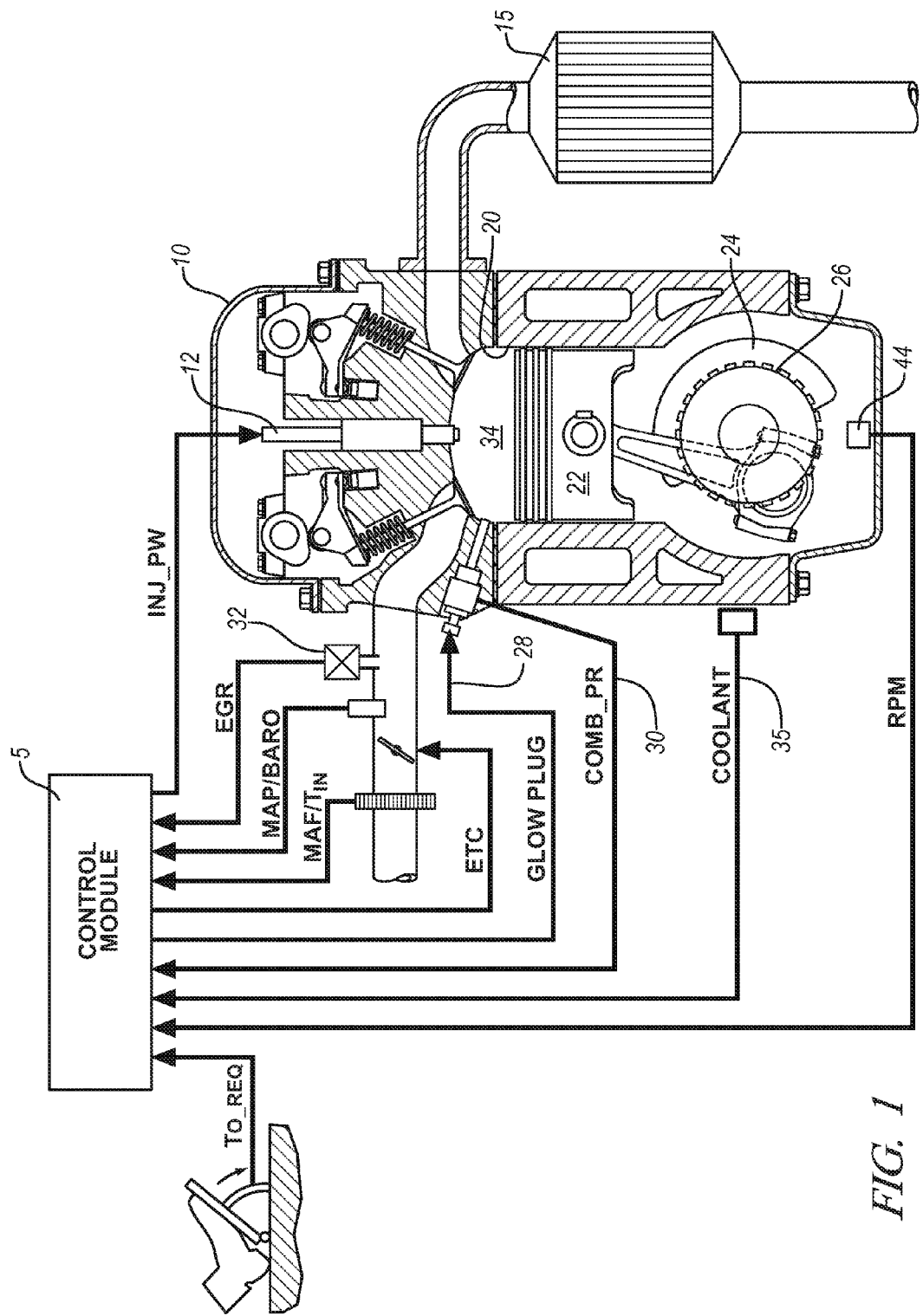
FIG. 1 is a schematic diagram depicting an internal combustion engine, a control module, and an exhaust aftertreatment system, in accordance with the present disclosure.

Referring now to the drawings, wherein the showings are for the purpose of illustrating certain exemplary embodiments only and not for the purpose of limiting the same, FIG. 1 is a schematic diagram depicting an internal combustion engine 10, a control module 5, and exhaust aftertreatment system 15, in accordance with the present disclosure. The exemplary engine includes a multi-cylinder, direct-injection internal combustion engine having reciprocating pistons 22 attached to a crankshaft 24 and movable in cylinders 20 which define variable volume combustion chambers 34. Engines are known to operate under compression ignition or spark ignition. Additionally, methods are known to utilize either ignition strategy in a single engine, modulating strategy based upon factors such as engine speed and load. Additionally, engines are known to operate in hybrid strategies, such as spark assisted, compression ignition strategies. This disclosure is intended to include these exemplary embodiments of engine operation, but is not intended to be limited thereto. The crankshaft 24 is operably attached to a vehicle transmission and driveline to deliver tractive torque thereto, in response to an operator torque request ($T_{O\_REQ}$). The engine preferably employs a four-stroke operation wherein each engine combustion cycle includes 720 degrees of angular rotation of crankshaft 24 divided into four 180-degree stages of intake-compression-expansion-exhaust, which are descriptive of reciprocating movement of the piston 22 in the engine cylinder 20. A multi-tooth target wheel 26 is attached to the crankshaft and rotates therewith. The engine includes sensing devices to monitor engine operation, and actuators which control engine operation. The sensing devices and actuators are signally or operatively connected to the control module 5.

The engine 10 preferably includes a direct-injection, four-stroke, internal combustion engine including a variable volume combustion chamber defined by the piston reciprocating within the cylinder between top-dead-center and bottom-dead-center points and a cylinder head including an intake valve and an exhaust valve. The piston reciprocates in repetitive cycles each cycle including intake, compression, expansion, and exhaust strokes.

The engine 10 preferably has an air/fuel operating regime that is primarily lean of stoichiometry. One having ordinary skill in the art understands that aspects of the disclosure are applicable to other engine configurations that operate primarily lean of stoichiometry, e.g., lean-burn spark-ignition engines. The exemplary methods defined herein are applicable to stratified gasoline spark-ignition direct-injection engines (SG-SIDI). During normal operation of the compression-ignition engine, a combustion event occurs during each engine cycle when a fuel charge is injected into the combustion chamber to form, with the intake air, the cylinder charge. In diesel cycle engines, combustion timing is generally coincident with the main fuel injection near top dead center, whereas in controlled auto-ignition or homogeneous charge compression ignition engines fuel injection is earlier in the combustion cycle and ignition timing is controlled near top dead center in accordance with control of in-cylinder conditions (including temperature and pressure) and may include a spark assist from an ignition source during, for example, low speed and low load engine operation.

Sensing devices are installed on or near the engine to monitor physical characteristics and generate signals which are correlatable to engine and ambient parameters. The sensing devices include a crankshaft rotation sensor, including a crank sensor 44 for monitoring crankshaft speed (RPM) through sensing edges on the teeth of the multi-tooth target wheel 26. The crank sensor is known, and may include, e.g., a Hall-effect sensor, an inductive sensor, or a magnetoresistive sensor. Signal output from the crank sensor 44 (RPM) is input to the control module 5. There is a combustion pressure sensor 30, including a pressure sensing device adapted to monitor in-cylinder pressure (COMB_PR). The combustion pressure sensor 30 preferably includes a non-intrusive device including a force transducer having an annular cross-section that is adapted to be installed into the cylinder head at an opening for a glow-plug 28 in the case of a diesel engine. A spark plug may supplant the glow plug in the case of controlled auto-ignition or homogeneous charge compression ignition engines. The combustion pressure sensor 30 is installed in conjunction with the glow-plug 28, with combustion pressure mechanically transmitted through the glow-plug to the sensor 30. The output signal, COMB_PR, of the sensing element of sensor 30 is proportional to cylinder pressure. The sensing element of sensor 30 includes a piezoceramic or other device adaptable as such. Other sensing devices preferably include a manifold pressure sensor for monitoring manifold pressure (MAP) and ambient barometric pressure (BARO), a mass air flow sensor for monitoring intake mass air flow (MAF) and intake air temperature (TN), and, a coolant sensor 35 (COOLANT). The system may include an exhaust gas sensor for monitoring states of one or more exhaust gas parameters, e.g., temperature, air-fuel ratio, and constituents. One having ordinary skill in the art understands that there may be other sensing devices and methods for purposes of control and diagnostics. The operator input, in the form of the operator torque request, $T_{O\_REQ}$, may be obtained through a throttle pedal and a brake pedal, among other devices. The engine is preferably equipped with other sensors for monitoring operation and for purposes of system control.

Each of the sensing devices is signally connected to the control module 5 to provide signal information which is transformed by the control module 5 to information representative of the respective monitored parameter. It is understood that this configuration is illustrative, not restrictive, including the various sensing devices being replaceable with functionally equivalent devices and algorithms and still fall within the scope of the disclosure.

The actuators are installed on the engine and controlled by the control module 5 in response to operator inputs to achieve various performance goals. Actuators include an electronically-controlled throttle device which controls throttle opening to a commanded input (ETC), and a plurality of fuel injectors 12 for directly injecting fuel into each of the combustion chambers in response to a commanded input (INJ_PW), all of which are controlled in response to the operator torque request ($T_{O\_REQ}$). An exhaust gas recirculation valve 32 controls flow of externally recirculated exhaust gas to the engine intake, in response to a control signal (EGR) from the control module. The glow-plug 28 includes a known device, installed in each of the combustion chambers, adapted for use with the combustion pressure sensor 30.

The fuel injector 12 is an element of a fuel injection system, which includes a plurality of high-pressure fuel injector devices each adapted to directly inject a fuel charge, including a mass of fuel, into one of the combustion chambers in response to the command signal, INJ_PW, from the control module 5. Each of the fuel injectors 12 supply pressurized fuel from a fuel distribution system, and have operating characteristics including a minimum pulsewidth and an associated minimum controllable fuel flow rate and a maximum fuel flow rate.

The engine 10 may be equipped with a controllable valvetrain operative to adjust openings and closings of intake and exhaust valves of each of the cylinders, including any one or more of valve timing, phasing (i.e., timing relative to crank angle and piston position), and magnitude of lift of valve openings. One exemplary system includes variable cam phasing, which is applicable to compression-ignition engines, spark-ignition engines, and homogeneous-charge compression ignition engines.

Control module, module, controller, control unit, processor and similar terms mean any suitable one or various combinations of one or more of Application Specific Integrated Circuit(s) (ASIC), electronic circuit(s), central processing unit(s) (preferably microprocessor(s)) and associated memory and storage (read only, programmable read only, random access, hard drive, etc.) executing one or more software or firmware programs, combinational logic circuit(s), input/output circuit(s) and devices, appropriate signal conditioning and buffer circuitry, and other suitable components to provide the described functionality. The control module 5 has a set of control algorithms, including resident software program instructions and calibrations stored in memory and executed to provide the desired functions. The algorithms are preferably executed during preset loop cycles. Algorithms are executed, such as by a central processing unit, and are operable to monitor inputs from sensing devices and other networked control modules, and execute control and diagnostic routines to control operation of actuators. Loop cycles may be executed at regular intervals, for example each 3.125, 6.25, 12.5, 25 and 100 milliseconds during ongoing engine and vehicle operation. Alternatively, algorithms may be executed in response to occurrence of an event.

The control module 5 executes algorithmic code stored therein to control the aforementioned actuators to control engine operation, including throttle position, fuel injection mass and timing, EGR valve position to control flow of recirculated exhaust gases, glow-plug operation, and control of intake and/or exhaust valve timing, phasing, and lift, on systems so equipped. The control module is adapted to receive input signals from the operator (e.g., a throttle pedal position and a brake pedal position) to determine the operator torque request, $T_{O\_REQ}$, and from the sensors indicating the engine speed (RPM) and intake air temperature ($T_{IN}$), and coolant temperature and other ambient conditions.

Figure 2:
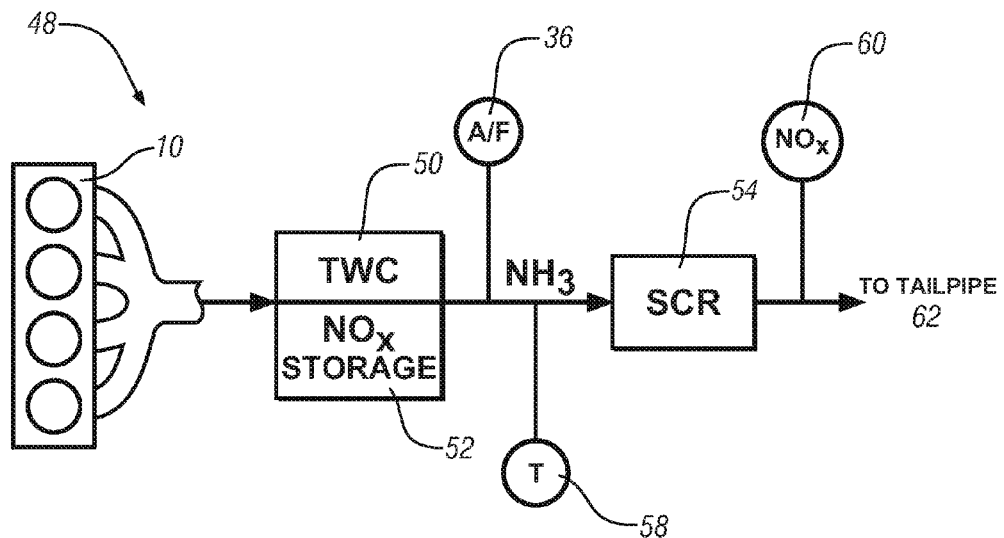
FIG. 2 schematically illustrates a passive-SCR system, in accordance with an exemplary embodiment of the present disclosure.
Figure 3:
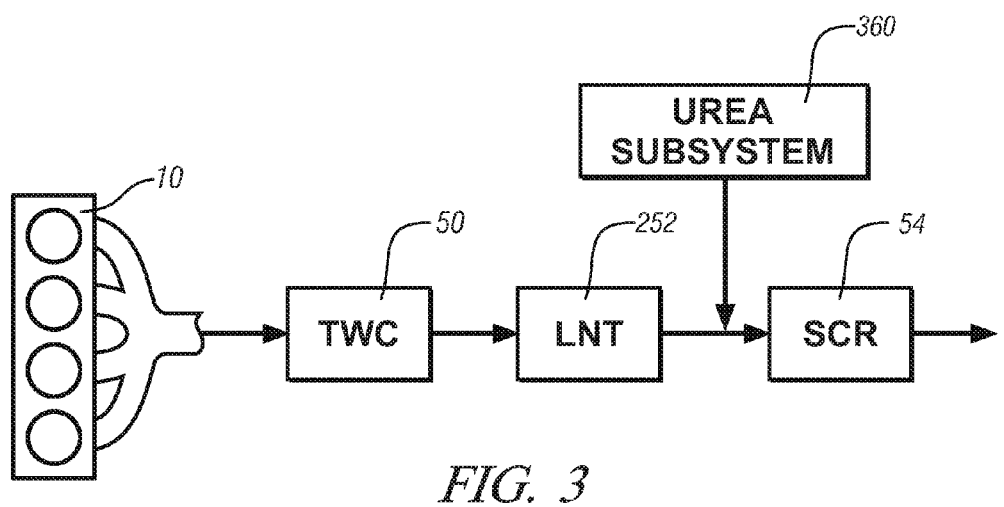
FIG. 3 schematically illustrates an exemplary exhaust aftertreatment system.

Referring to FIG. 3, an exhaust aftertreatment system for engines operated in lean operating modes integrate a Lean NOx trap (LNT) 252 and a urea injection subsystem 360, where the LNT 252 has catalysts therein capable of collecting and storing some amount of NOx in the exhaust flow. The urea injection subsystem 360 is configured to inject urea into the exhaust after treatment system and derive ammonia, wherein the ammonia is effective to reduce NOx emissions. However, LNTs and urea injection systems are costly and increase the number of assembly parts within the exhaust aftertreatment system. The exemplary passive-SCR system 48 shown in FIG. 2 does not require the LNT or the urea injection subsystem. FIG. 2 schematically illustrates a passive-SCR system 48, in accordance with an exemplary embodiment of the present disclosure. The passive-SCR system 48 is part of the exhaust aftertreatment system 15 shown in FIG. 1. The passive-SCR system 48 includes a three-way catalyst (TWC) device 50 and a selective catalytic reduction device (SCR) 54. The passive-SCR system 48 receives exhaust flow downstream from the internal combustion engine 10 and delivers treated exhaust flow downstream to the tailpipe 62. The TWC device 50 is a catalytic converter device used to convert NOx, HC, and CO into emissions conforming gases. In an alternative embodiment, in place of a TWC device, a diesel engine integrates a diesel oxidation catalyst configured to oxidize CO and unburnt hydrocarbons into CO2 and water within an exhaust flow from the diesel engine.

Referring again to FIG. 2, the TWC device 50 further includes a NOx storage component (NSC) 52 located therein and configured to collect and store NOx molecules within the exhaust flow, preferably during lean combustion modes. The exemplary NSC 52 can be further configured to release NOx molecules into the exhaust flow, wherein the NOx molecules are effective to react with hydrogen within the exhaust flow to thereby create ammonia within the exhaust flow. The SCR device 54 located downstream of said TWC device 50 stores the created ammonia for use in a reduction reaction to convert NOx into nitrogen and oxygen molecules and thereby reduce NOx in the exhaust flow. One exemplary embodiment includes a preferred one to one, NO to $NO_2$ proportion, and is known as a fast SCR reaction. Additionally, the exemplary passive-SCR system 48 includes additional devices utilized to perform particular functions associated with the operation of the aforementioned devices. For instance, air-fuel ratio (A/F) sensor 36, temperature (T) sensor 58 and NOx sensor 60 are depicted, enabling control of the passive-SCR system 48 by monitoring properties of the exhaust flow at various points in the passive-SCR system 48, wherein the generated signals are communicated to the control module 5 of FIG. 1.

Excess hydrogen can be created in the exhaust gas flow by operating the engine in a rich or stoichiometric range and the stored NOx releases and reacts with the hydrogen to generate ammonia. The exemplary NSC 52 within the TWC device 50 is configured to release NOx molecules into the exhaust flow and effectively react with hydrogen molecules to create ammonia. As mentioned above, in the exemplary embodiment, the SCR device 54 located downstream of the TWC device 50 utilizes the created ammonia in a reduction reaction to convert NOx into nitrogen and oxygen molecules. The nitrogen and oxygen molecules within the exhaust flow exit the vehicle through the tailpipe 62.

The amount of ammonia generated can be utilized in conjunction with a urea injection system, reducing the occurrence that the urea must be injected, or the ammonia generation can be managed to ensure that enough ammonia is present to treat NOx in the SCR device 54. Management of the ammonia generation can include any method contemplating generation and necessary storage of the components to the ammonia generation reaction and operation of conditions necessary to facilitate the necessary reactions in the exhaust gas flow and ensuring generation of sufficient ammonia to treat the NOx estimated to be in the exhaust gas flow.

In the exemplary embodiment, ammonia is produced in the TWC device 50 when stored NOx molecules are released and react with hydrogen ($H_2$) in the exhaust flow. It should be appreciated that other catalytic devices may be used by similar means to produce ammonia. Such production of ammonia ($NH_3$) results from an exemplary conversion process described by the following equation.

$$NO+CO+1.5H_2 \rightarrow NH_3+CO_2 \quad (1)$$

One having ordinary skill in the art will appreciate that this conversion requires molecular oxygen to be depleted from the catalyst before NO will release from the NSC 52 and react with the molecular hydrogen. Excess oxygen is frequently present when the internal combustion engine 10 is operated in lean operating modes, with the air-fuel ratio operated lean of stoichiometry or with excess air. Further, selection of an air-fuel ratio within the stoichiometric and rich operating ranges further facilitate the production of ammonia, for example, by producing NO and $H_2$ in appropriate quantities. In the exemplary equation above, an ideal ratio of 1.5 to one is evident. However, based upon the environment provided by the catalyst and other reactions taking place within the aftertreatment device, a different actual ratio can create optimal production of ammonia. One having ordinary skill in the art will appreciate that CO presence must also be considered to facilitate the reaction described above utilizing equation (1).

Alternatively, other embodiments can produce $NH_3$ without a CO presence. Embodiments envisioned can include utilizing Barium stored in the NSC 52, or in the alternative, Barium stored in a LNT. Production of $NH_3$ results from two alternative exemplary conversion processes described by the following equations.

$$2.5H_2+NO \rightarrow NH_3+H_2O \quad (2)$$

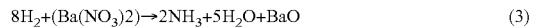

$$8H_2+(Ba(NO_3)2) \rightarrow 2NH_3+5H_2O+BaO \quad (3)$$

Referring to equations (2) and (3), it should be appreciated that equation (2) can occur in a plurality of aftertreatment devices including the TWC device 50, a LNT or diesel oxidation catalysts (DOC), so long as a platinum group metal (PGM) catalyst is present. However, equation (3) requires Barium to be present as a catalyst in a storage component such as the NSC device 52 of the present disclosure.

Molecular hydrogen production, required for generation of ammonia, can occur in the engine through the combustion process. Combustion in an air-fuel ratio rich environment, wherein molecular oxygen is scarce, tends to produce elevated levels of molecular hydrogen. The hydrogen production can occur as the result of a single injection combustion cycle, with hydrogen generation resulting from a primary combustion event that provides work output to the engine.

Furthermore, lean combustion modes are known to result in lower exhaust flow temperatures, and stoichiometric or rich combustion modes are known to result in higher exhaust flow temperatures, wherein molecular oxygen is scarce and levels of molecular hydrogen are elevated. If a particular temperature range of exhaust flow is needed, an engine control strategy, as implemented for example within an engine control module, can be modified to generate the preferred exhaust flow temperature, and hence, the preferred level of molecular hydrogen. For instance, an engine operated in a lean operating mode can be implemented to raise molecular hydrogen levels by modifying the engine control module to periodically operate the engine rich of stoichiometry, for example by introducing rich of stoichiometry fuel pulses. Additionally, rich operation is utilized during occasional periods wherein lean operation is not possible or preferable. For example, rich operation is frequently utilized in instances of acceleration, wherein generating force required to accelerate a vehicle requires high engine loads, and traversing transmission operating range states requires engine speeds including high engine speeds.

Catalysts, as described above, to store NOx within the aftertreatment device, such as the TWC or DOC, can take many forms and include different materials accomplishing the NOx storage. In an exemplary embodiment, the NSC 52 includes barium (Ba) or potassium (K) for NOx storage.

It is appreciated that the aftertreatment device utilizing the TWC 50 and the NSC 52 releases NOx to create $NH_3$ in the exhaust flow without facilitation of a LNT. However, alternative embodiments are envisioned that utilize a LNT to store and release NOx to create $NH_3$ in the exhaust flow.

The disclosure has described certain preferred embodiments and modifications thereto. Further modifications and alterations may occur to others upon reading and understanding the specification. Therefore, it is intended that the disclosure not be limited to the particular embodiment(s) disclosed as the best mode contemplated for carrying out this disclosure, but that the disclosure will include all embodiments falling within the scope of the appended claims.

The invention claimed is:

1. Method for reducing NOx molecules in an exhaust flow within an exhaust aftertreatment system of an internal combustion engine, the method comprising:
    storing NOx from the exhaust flow on a NOx storage component located within an aftertreatment device comprising a three-way catalyst device exposed to the exhaust flow;
    monitoring an exhaust gas flow temperature;
    comparing the exhaust gas flow temperature to a desired exhaust gas flow temperature, the desired exhaust gas flow temperature corresponding a desired magnitude of molecular hydrogen utilized for creating ammonia;
    when the exhaust gas flow temperature is less than the desired exhaust gas flow temperature, transitioning engine operation from a lean of stoichiometric operating mode to one of a stoichiometric operating mode and a rich of stoichiometric operating mode to increase the exhaust gas flow temperature to achieve the desired exhaust gas flow temperature;
    when the exhaust flow includes the desired magnitude of molecular hydrogen, releasing the stored NOx to create ammonia in the exhaust flow; and
    in a selective catalytic reduction device that is downstream of the three-way catalyst device, utilizing the created ammonia to reduce NOx in the exhaust flow.

2. The method of claim 1, wherein the NOx storage component comprises barium.

3. The method of claim 1, wherein the NOx storage component comprises potassium.

4. The method of claim 1, wherein the NOx that is stored on the NOx storage component is released during stoichiometric operating modes of the internal combustion engine.

5. The method of claim 1, wherein the NOx that is stored on the NOx storage component is released during rich of stoichiometric operating modes of the internal combustion engine.

6. The method of claim 1, wherein the selective catalytic reduction device stores the created ammonia.

7. Method for reducing NOx molecules in an exhaust flow from an internal combustion engine, the method comprising:
    storing NOx from the exhaust flow on a NOx storage component located within a three-way catalyst device exposed to the exhaust flow;
    monitoring an exhaust gas flow temperature;
    comparing the exhaust flow temperature to a desired exhaust flow temperature, the desired exhaust flow temperature corresponding to a desired magnitude of molecular hydrogen utilized for creating ammonia;
    periodically operating the engine rich of stoichiometry to increase the exhaust flow temperature to achieve the desired exhaust flow temperature for providing the desired magnitude of molecular hydrogen in the exhaust flow;
    utilizing the stored NOx in combination with the desired magnitude of molecular hydrogen to create ammonia in the exhaust flow; and
    in a selective catalytic reduction device that is downstream of the catalytic reduction device, utilizing the created ammonia to reduce NOx in the exhaust flow.

8. An exhaust aftertreatment system for an internal combustion engine, comprising:
    a temperature sensor configured to monitor exhaust gas flow temperature in the exhaust aftertreatment system;
    a control module configured to execute the following steps, comprising
        comparing the monitored exhaust gas flow temperature with a desired exhaust gas flow temperature, the desired exhaust gas flow temperature corresponding to a desired magnitude of molecular hydrogen utilized for creating ammonia, and
        when the exhaust gas flow temperature is less than the desired exhaust gas flow temperature, transitioning engine operation from lean operating modes of the engine to one of a stoichiometric and rich operating mode of the engine to increase the exhaust gas flow temperature to achieve the desired exhaust gas flow temperature;
    a NOx storage component located within an aftertreatment device effective to store NOx from the exhaust gas flow during the lean operating modes of the engine and effective to release said stored NOx into the exhaust flow during the one of the stoichiometric and rich operating mode of the engine, wherein the released NOx combines with the desired magnitude of molecular hydrogen in the exhaust gas flow to create ammonia; and
    a downstream selective catalytic reduction device effective to reduce NOx in the exhaust gas flow in the presence of the created ammonia.

9. The apparatus of claim 8, wherein the aftertreatment device is a three-way catalyst.

10. The apparatus of claim 8, wherein the NOx storage component comprises barium.

11. The apparatus of claim 8, wherein the NOx storage component comprises potassium.

12. The apparatus of claim 8, wherein the aftertreatment device is a diesel oxidation catalyst.

\* \* \* \* \*